United States Patent [19]

Hopkins et al.

[11] Patent Number: 4,983,194
[45] Date of Patent: Jan. 8, 1991

[54] PRODUCTION OF HIGH PURITY ARGON

[75] Inventors: Jeffrey A. Hopkins, Whitehall; Roger M. McGuinness, Macungie; Rakesh Agrawal; Steven L. Feldman, both of Allentown, all of Pa.

[73] Assignee: Air Products and Chemicals, Inc., Allentown, Pa.

[21] Appl. No.: 475,070

[22] Filed: Feb. 2, 1990

[51] Int. Cl.$^5$ .............................................. F25J 3/06
[52] U.S. Cl. .......................................... 62/22; 62/24; 423/219
[58] Field of Search ....................... 62/22, 24; 423/219

[56] References Cited

U.S. PATENT DOCUMENTS

| 3,535,074 | 10/1970 | Nakashima | 23/2 |
| 3,697,445 | 10/1972 | Carter | 252/452 |
| 4,579,723 | 4/1986 | Weltmer et al. | 423/219 |
| 4,713,224 | 12/1987 | Tamhankar et al. | 423/219 |
| 4,871,382 | 10/1989 | Thorogood et al. | 62/24 |

FOREIGN PATENT DOCUMENTS

| 0331028 | 9/1989 | European Pat. Off. |
| 8400096 | 7/1985 | France |
| 566440 | 3/1975 | Japan |
| 6222293 | 1/1979 | Japan |
| 959810 | 9/1982 | U.S.S.R. |
| 1416820 | 8/1988 | U.S.S.R. |
| 1263132 | 2/1972 | United Kingdom |

OTHER PUBLICATIONS

BASF-Catalyst R3-11 Basic Chemicals Technical Leaflet pp. 2-12.
Air as a Ternary Mixture, Chap. IX, pp. 216-227.
R. E. Latimer, Distillation of Air, Feb. 1967, pp. 35-59 Chemical Engineering Progress (vol. 63, No. 2).
A. S. Barabash, et al, Catalyst and Adsorption Chemical Treatment for Removing Oxygen from Inert Gases, Hydrogen and Methane pp. 1-6.

Primary Examiner—Ronald C. Capossela
Attorney, Agent, or Firm—John M. Fernbacher; James C. Simmons; William F. Marsh

[57] ABSTRACT

A process for making high purity argon is disclosed in which crude argon containing less than about 0.8 mol % oxygen is recovered from air in a cryogenic distillation system, the crude argon is purified by removing oxygen in a getter system, and other impurities are removed by cryogenic distillation to yield a high purity argon product. The crude argon purification system is heat integrated with the main cryogenic air separation system. High purity argon can be produced at argon recoveries greater than 90% by utilizing structured packing in at least a portion of the argon sidearm column.

17 Claims, 5 Drawing Sheets

PRODUCTION OF HIGH PURITY ARGON

BACKGROUND OF THE INVENTION

The recovery and purification of argon for use in the metallurgical and electronics industries is an important aspect of the air separation industry. Argon is recovered by the well-known process of cryogenic air separation using a double distillation column of the Linde type with an argon sidearm column to recover crude argon from a low pressure column sidestream. This process is described by R. E. Latimer in an article entitled "Distillation of Air" in Chemical Engineering Progress, 63(2), 35-59 (1967), and typically produces a crude argon product containing between 2 and 5 mol % oxygen and less than 1mol % nitrogen. Since argon is a valuable product, it is desirable to maximize its recovery at acceptable purity levels. With currently practiced process technology, crude argon containing less than about 2.0 mol % oxygen can be produced only by reducing recovery to generally unacceptable levels. This relationship between recovery and purity in current process technology is well known and is described in the textbook entitled "Separation of Gases" by M. Ruhemann, Second Edition, Oxford University press, 1949, at page 223.

Soviet Patent Application No. SU 1416820 A discloses a two-zone argon sidearm column to increase argon purity at an acceptable recovery in which a first zone contains a number of sieve trays such that the pressure at the top of the zone is near atmospheric. The gas from the top of this zone is warmed, compressed, cooled, and fed to the lower part of a second zone, and a crude argon stream containing a reduced concentration of oxygen is withdrawn from the top of this second zone. Additional heat exchange and compression equipment is required to accomplish this improved argon purity.

The removal of oxygen from typical crude argon streams containing 2 to 5 mol % oxygen is commonly accomplished by catalytic reaction with hydrogen over a platinum or palladium catalyst to yield water. The argon is then dried and cooled to cryogenic temperature for removal of residual hydrogen and other impurities by distillation. A large recycle stream (about 1:1 recycle:crude argon) of ambient temperature deoxygenated argon is combined with the crude argon feed to the catalytic reactor to control the reactor exotherm at a safe level. This is required because the high heat of reaction with a feed containing 2-5 mol % oxygen can cause overheating of the reactor. A compressor or blower is required for this recycle. In addition, excess hydrogen is required to ensure satisfactory oxygen removal, and the removal of hydrogen from the cooled and dried reactor effluent requires additional trays in the distillation column for final argon purification. A high purity argon product containing less than 5 ppmv oxygen is obtained by this well-known method.

European Patent Office Publication No. 0 331 028 A1 discloses a method for the recovery of high purity argon at a purity of 99.999 vol % from crude argon containing 90 to 99 vol % argon in which a vapor and a liquid crude argon stream are taken overhead from an argon sidearm column and are warmed and vaporized respectively. The warmed vapor is combined with an oxygen-free argon recycle stream, is compressed, and is combined with the vaporized crude argon stream; the combined argon stream is mixed with a hydrogen-containing stream and passed through a catalytic reactor in which oxygen combines with hydrogen to form water. The water is removed in a drier and the resulting argon stream is purified in a final distillation step to yield high purity argon product.

Oxygen can be removed from argon and other inert gases by gettering in which the oxygen is reacted with one or more reduced metals typically supported on a catalyst substrate and packed into a reactor vessel. U.S. Pat. No. 3,697,445 and British Patent No. 1,263,132 disclose a high surface area nickel getter catalyst containing 25 to 50 wt % nickel on silica for the removal of oxygen from inert gases at ambient temperatures or below. The catalyst can be used to remove oxygen to less than about 0.2 ppmv and can be regenerated by reduction with hydrogen at 200°-500° C.

A catalyst for oxygen removal containing 30 wt % copper on a carrier substrate is described in a Technical Leaflet on Catalyst R3-11 by BASF Corporation. The catalyst can be used to remove oxygen from inert gases by gettering at temperatures up to 250° C., and the catalyst can be regenerated by reduction with hydrogen. When oxygen concentrations are above about 0.5-2.0 mol %, the feed must be diluted to hold the temperature below 250° C., or a special high temperature catalyst must be used.

A one-step process for the removal of an impurity selected from oxygen, CO, $CO_2$, hydrogen, water, or mixtures thereof at less than 1000 ppmv in an inert gas is disclosed in U.S. Pat. No. 4,713,224. The gas is passed over a catalyst comprising at least 5 wt % nickel at a temperature between 0° and 50° C. and a product containing less than several ppmv impurities is obtained. The catalyst is regenerated by purging with nitrogen and hydrogen at 180° to 200° C.

French Patent Application No. 84 00096 discloses the removal of impurities comprising oxygen and other components from noble gases by contacting the gas with porous pellets of a titanium-zirconium alloy at temperatures between 400° and 900° C. The alloy can be regenerated after saturation by applying a vacuum or a reducing atmosphere.

U.S.S.R. Patent Application No. 2,995,864/23-26 discloses the removal of oxygen impurity from an inert gas by contacting the gas at room temperature with a reduced form of a catalyst containing oxides of chromium, zinc, aluminum, and copper. Spent catalyst is regenerated by contacting with a reducing nitrogen-hydrogen mixture.

The removal of oxygen from an inert gas by contacting with a well-reduced nickel catalyst at room temperature is disclosed in Japanese Patent Application No. 45-123711. Methods for the preparation of the catalyst are disclosed and its regeneration by contacting with hydrogen at between 30° and 200° C. is described.

In an article entitled "Catalytic and Adsorption Chemical Treatment for Removing Oxygen from Inert Gases, Hydrogen, and Methane" in *Khim. Prom-st (Moscow)* (6), 373-4, A. S. Barabash et al describe the removal of oxygen from inert and other gases by contacting with a nickel/$Cr_2O_3$ adsorbent at between 20° and 200° C. Oxidized nickel is reduced with hydrogen at 280° C. for further oxygen removal.

Japanese Patent Publication No. 62(1987)-22,923 discloses method for the removal of oxygen from an inert gas by adding hydrogen to the inert gas, passing the gas over a palladium catalyst to convert most of the oxygen to water, and then passing the gas over a copper and/or nickel catalyst which removes residual oxygen by gettering. When the catalyst nears exhaustion, a controlled amount of hydrogen is added to the gas flowing to the copper and/or nickel catalyst which is then regenerated. The water in the final product is removed by drying if necessary.

U.S. Pat. No. 3,535,074 describes a method and appartus for removing oxygen from an inert gas by adding excess hydrogen to the gas, passing the gas over a catalyst containing a platinum-group metal, and then passing the gas over a copper and/or nickel catalyst to remove residual oxygen. The copper and/or nickel catalyst serves as a guard in the event that the feed gas contains a increased amount of oxygen. Excess hydrogen and water are then removed from the final product.

The removal of parts per million levels of impurities such as oxygen, CO, $CO_2$, hydrogen, and water from an inert gas stream is disclosed in U.S. Pat. No. 4,579,723. The gas is passed initially through a first bed of catalyst containing chromium and platinum in which CO reacts with oxygen to form $CO_2$, and hydrogen reacts with oxygen to form water at ambient temperature. The gas then is passed through a second bed of catalyst containing a getter comprising copper, nickel, and cobalt, which removes oxygen and traps $CO_2$. Water is generally retained in the first bed, and alumina can be added to the first bed if the water concentration in the feed inert gas is above a predetermined level.

SUMMARY OF THE INVENTION

The invention is a process for making high purity argon by recovering an argon-enriched sidestream from the low pressure column of a dual-column cryogenic air separation distillation system, and passing this sidestream to an argon sidearm column to recover a crude argon stream containing less than about 0.8 mol % oxygen. The crude argon stream is further purified in a final purification system comprising a combination of a getter system for the removal of oxygen by chemical reaction with a metal-containing getter catalyst and an argon purification distillation column for the removal of impurities other than oxygen, thus yielding a high-purity argon product.

In one embodiment of the invention, impurity components other than oxygen are first removed from the crude argon stream by cryogenic distillation to yield a purified crude argon stream, and oxygen is then removed by passing the stream through a first bed of the metal-containing getter catalyst which chemically sorbs the oxygen, thus yielding the high purity argon product. In an alternate embodiment of the invention, oxygen is first removed from the crude argon stream by reaction with the metal-containing getter catalyst, and the remaining impurities are removed by cryogenic distillation.

DETAILED DESCRIPTION OF THE INVENTION

The present invention is a process for the recovery of high purity argon from air at high recovery by first separating air in a cryogenic distillation system comprising a high pressure column, a low pressure column, and an argon sidearm column. Oxygen and nitrogen can be recovered in various combinations and purities depending on the selected process conditions and equipment configurations. A sidestream is withdrawn from the low pressure column and further rectified in the argon sidearm column to produce a crude argon stream, which in turn is purified further to remove oxygen and other contaminants to yield a high purity argon product. In the present invention, the argon sidearm column is designed and operated such that a crude argon product containing less than about 0.8 mol % oxygen is produced. Argon recovery of greater than about 90% optionally can be achieved at this crude argon purity by utilizing a structured packing or a combination of structured packing and conventional sieve trays in the argon sidearm column and operating the column at an overhead pressure such that the flow of crude liquid oxygen to the reboiler/condenser at the top of the argon sidearm column is between about 1.04 to 1.36 times the theoretical flow of crude liquid oxygen required to vaporize this flow completely to its dew point. The argon sidearm column contains at least the minimum number of theoretical stages required to produce the required minimum oxygen concentration in the crude argon product. Copending patent application having Ser. No. 07/474,431 Feb. 2, 1990 further describes this argon recovery process and the specification of that application is incorporated herein by reference. Structured packing is defined as a geometrically placed packing which promotes vapor and liquid mixing and intermixing in a direction perpendicular to the primary flow direction and allows a pressure drop per unit length which is significantly lower than conventional vapor-liquid contacting devices such as sieve trays or bubble cap trays. Such structured packing is well known in the art and is available commercially in various configurations.

Crude argon from the argon sidearm column of the present invention typically contains up to about 1.0 mol % nitrogen as well as the oxygen impurity described above. These impurities are removed in the present invention by the combination of the steps of (1) distillation and (2) reaction with one or more reduced metal getters, which steps remove nitrogen and oxygen respectively. Removal of oxygen by means of chemical reaction or chemisorption, which is also termed gettering, is economically feasible according to the present invention because the oxygen content in the crude argon is much lower than in prior art argon recovery processes.

Figure 1:
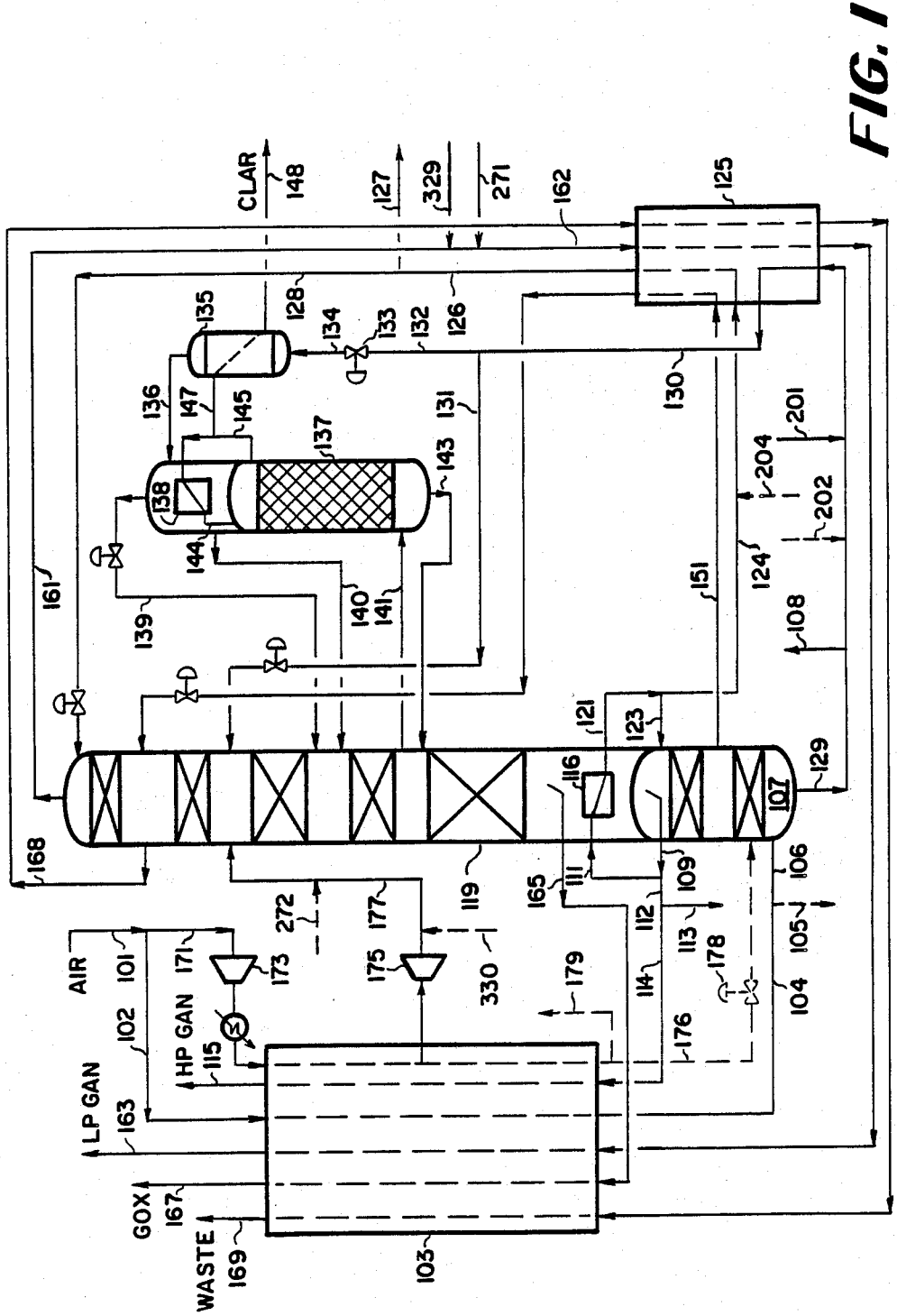
FIG. 1 is a schematic flow diagram of a cryogenic air separation process of the present invention for the recovery of a crude argon product.

Referring now to FIG. 1, a stream of pressurized air which is essentially free of water and carbon dioxide enters the process through line 101 and is split into two streams 102 and 171. Stream 102 is cooled in heat exchanger 103 and the cooled stream 104 optionally is split into stream 105, which optionally is passed to the final argon purification system as described later, and stream 106 flows into high pressure distillation column 107. Stream 106 is separated into nitrogen-rich high-pressure overhead stream 109 and oxygen-rich bottoms stream 129. Stream 109 is split into streams 111 and 112, and stream 113 is withdrawn from stream 112 and passed to the final argon purification system as described later. The remaining stream 114 is warmed is exchanger 103 and is discharged as high-pressure nitrogen product 115; the other portion of the high-pressure nitrogen, stream 111, is condensed against boiling liquid oxygen in reboiler 116 located in the bottom liquid sump of low pressure distillation column 119. Condensed nitrogen stream 121 is split into stream 123, which provides reflux to column 107, and stream 124, which is subcooled in heat exchanger 125; the resulting subcooled stream 126 is split into stream 127, which is passed to the final argon purification system as described later, and stream 128 which after pressure reduction is fed as reflux into the top of low pressure column 119. Optionally, stream 204 is returned from the final argon purification system as described later and combined with stream 124.

The crude liquid oxygen stream 129 from the bottom of high pressure column 107 is subcooled in heat exchanger 125, and the cooled stream 130 optionally is split into streams 131 and 132. Stream 108 is withdrawn from stream 129 for use in the crude argon purification system described later and is returned as stream 201 as shown in FIG. 1. Optionally, stream 202 is returned from the final argon purification system as described later and combined with stream 129. Stream 131 optionally is expanded and fed at an intermediate point into low pressure column 119; stream 132 is expanded across valve 133 and the expanded stream 134 is warmed in heat exchanger 135 and the resulting stream 136 is further warmed on the boiling side of reboiler-condenser 138 of argon sidearm column 137. Liquid stream 140 is fed to an intermediate point of low pressure distillation column 119, and the vapor stream 139 formed by the vaporization of stream 136 is fed to column 119 near the feed point of stream 140.

Sidestream 141 containing oxygen and argon with a minor amount of nitrogen is fed into the bottom of argon sidearm distillation column 137 and is separated into crude argon overhead vapor stream 145 and bottoms stream 143, which is returned to the low pressure column 119 near the withdrawal point of stream 141. A portion of crude argon overhead stream 145 is withdrawn as stream 147, and the remaining portion is condensed in reboiler-condenser 138 to yield liquid stream 144 which is fed as reflux to argon column 137. Sidearm distillation column 137 can contain trays, structured packing, or a combination thereof to promote vapor-liquid contacting and mass transfer sufficient to produce a crude argon overhead vapor stream containing less than about 0.8 mol % oxygen. Crude argon overhead vapor stream 147 is condensed against stream 134 in heat exchanger 135 and the crude liquid argon stream 148 passes to the argon purification system as described later. Alternately, crude liquid argon can be withdrawn as a portion of stream 144. Alternately, crude argon overhead vapor stream 147 can be passed directly to the argon purification system, in which case heat exchanger 135 and streams 105 and 201 are not required.

The second portion of the feed air, stream 171, is compressed in compressor 173, cooled against external refrigeration, further cooled in heat exchanger 103, expanded in expander 175, and is passed as stream 177 into low pressure column 119 at an intermediate point. In some cases it is desirable to withdraw a liquid air stream 176 from the main exchanger 103, expand it for example across valve 178, and feed it to the high pressure column 107 so that liquid products can be withdrawn from the air separation system. In such a case, a portion 179 of the liquid air stream can be withdrawn for use in the final argon purification system as described later. Optionally, return streams 272 or 330 from the crude argon purification system as described later are introduced into stream 177. Sidestream 168 is withdrawn from column 119 at an upper intermediate point, warmed in heat exchangers 125 and 103 to recover refrigeration, and is discharged as waste stream 169. Overhead nitrogen stream 161 is warmed in these same two exchangers and is discharged as low pressure nitrogen product stream 163. Oxygen vapor stream 165 is withdrawn from above the bottom sump of column 119 and warmed in exchanger 103 to yield gaseous oxygen product stream 167. Finally, high pressure nitrogen stream 114 is warmed in exchanger 103 and discharged as high pressure nitrogen product stream 115.

When a crude argon purity of less than about 0.8 mol % oxygen is achieved at an optional recovery of greater than about 90%, the number of theoretical stages in argon sidearm column 137 must be at least that number required to produce the desired concentration of oxygen impurity in crude argon product stream 145. The flow rate of stream 136 is in the range of about 1.04 to about 1.36 times the theoretical minimum flow necessary to vaporize stream 136 completely in reboiler-condenser 138 such that the resulting vapor is at its dew point and the flow rate of stream 140 is zero. This is accomplished by utilizing structured packing or a combination of structured packing and conventional sieve trays in argon sidearm column 137 so that the total pressure drop across the column results in a pressure at the top of the column such that the flow rate of stream 136 can be maintained in the desired range.

Figure 2:
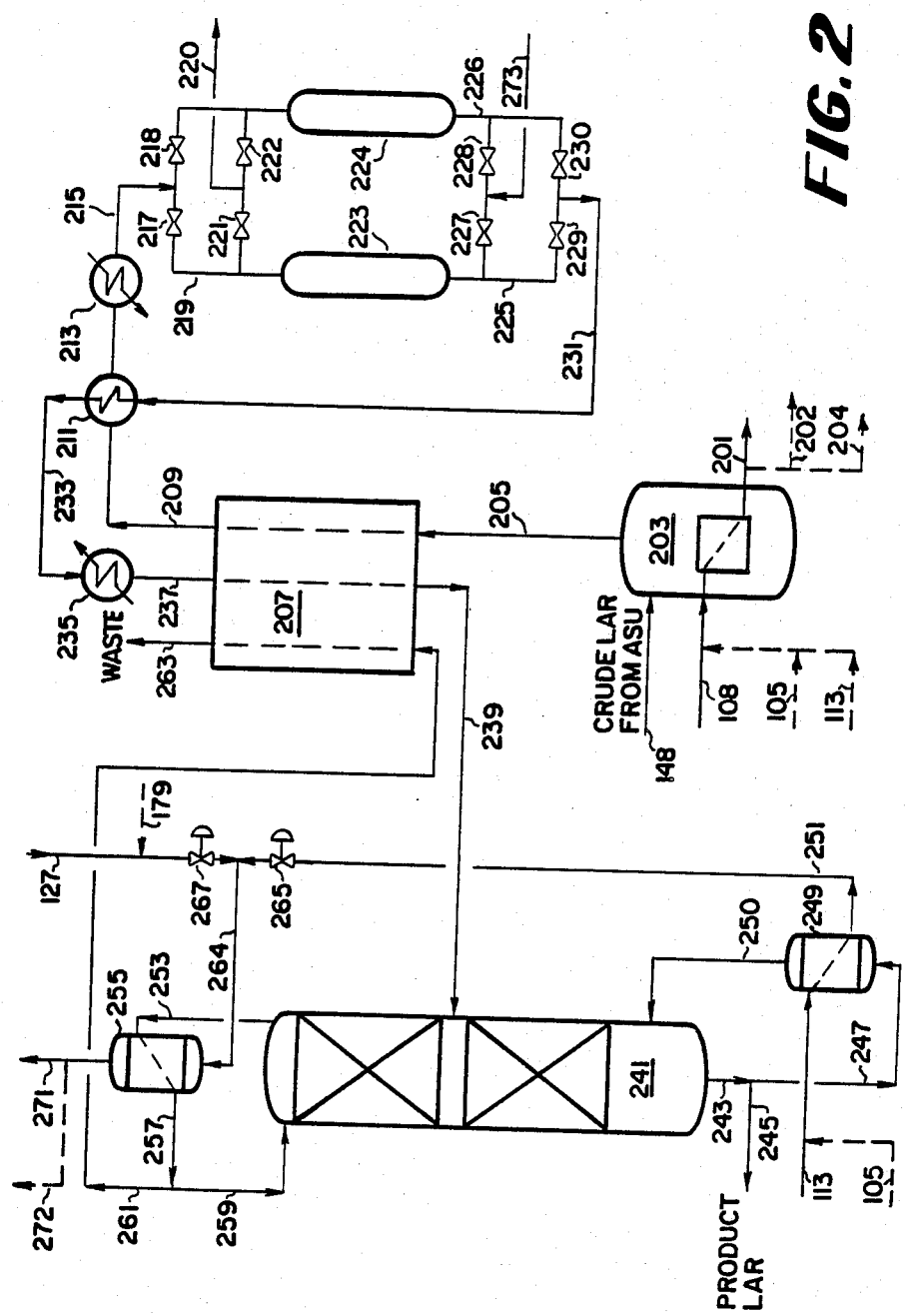
FIG. 2 is a schematic flow diagram of a process of the present invention to purify crude argon.

In a first embodiment of the invention, crude liquid argon stream 148 is purified according to the process shown in FIG. 2. Argon stream 148, at between about 20-45 psia and containing up to about 0.8 mol % oxygen and up to about 1.0 mol % nitrogen, is vaporized in heat exchanger 203 against crude liquid oxygen stream 108 to yield gaseous argon stream 205 and oxygen stream 201 which is returned to the cryogenic air separation unit (ASU) of FIG. 1. Alternately, vaporization of crude argon in heat exchanger 203 can be accomplished by the use of air stream 105 which after cooling is returned as stream 202 to the ASU of FIG. 1. In another alternate mode of operation, high pressure nitrogen stream 113 is used for the crude argon vaporization duty, and the cooled nitrogen stream 204 is returned to the ASU as shown in FIG. 1.

The pressure of crude argon stream 148 entering heat exchanger 203 is between 20 and 45 psia due to a static liquid head between exchanger 203 and heat exchanger 135; the pressure of stream 148 at the exit of exchanger 135 is typically about 18 psia. Crude argon vapor stream 205 is heated in exchangers 207 and 211, and is heated further in heater 213 to yield heated crude argon stream 215 at a temperature of between 200° and 450° F. The crude argon passes through valve 217 and manifold 219 into reactor 223 which contains a bed of one or more reduced metal getters on a suitable catalyst support. The reduced metal getters can be copper, nickel, or combinations thereof, or other getter metals regenerable by reduction with hydrogen. In reactor 223, oxygen reacts with the metal getter to yield an oxidized metal getter and thus is removed effectively by chemisorption. An intermediate argon product containing an average of less than about 2 ppmv oxygen passes through manifold 225 and valve 229, and the resulting stream 231 is cooled against crude argon stream 209 in exchanger 211. Stream 233 is cooled further in cooler 235 and heat exchanger 207, and the cooled argon stream 239 passes to argon purification distillation column 241.

During the purification of crude argon in reactor 223, valves 221, 218, 230, and 227 remain closed. Flow of argon through reactor 223 is continued for a predetermined period of time which depends upon the level of oxygen impurity in the crude argon; typically the period ranges between about 1 and 500 hours. Crude argon flow through reactor 223 is then discontinued by closing valves 217 and 229, and flow is directed through valve 218, reactor 224, and valve 230. Valves 222 and 228 remain closed at this point. Reactor 224 contains the identical reduced metal getter as initially contained in reactor 223, and the getter is in this reduced state after a previous regeneration step. While flow of crude argon into reactor 224 continues, the oxidized getter in reactor 223 is regenerated by first depressurizing the reactor by opening valve 221 and venting gas through line 220, opening valve 227, and passing therethrough via line 273 a stream containing about 0.5 to 3.0 mol % hydrogen in nitrogen or other inert gas. The hydrogen reacts with the oxidized getter metal to form water which is purged from the system through line 220, yielding a reduced metal getter in reactor 223. Upon completion of this regeneration step, a stream of pure nitrogen or of the final purified argon product is passed through line 273, valve 227, reactor 223, valve 221, and line 220 to purge remaining water and hydrogen from the reactor. Valves 221 and 227 are then closed, valve 229 is opened to pressurize reactor 223 with intermediate argon product, valve 229 is closed, and the reactor is ready for another period of argon purification. Optionally, the metal getter system can be designed and operated to produce a high purity argon product containing an average of less than about 1 ppmv oxygen by a combination of decreased reactor gas residence time and shorter onstream times between getter regeneration.

Cooled argon stream 239, now containing less than about two parts per million by volume (ppmv) oxygen, is fed into argon purification distillation column 241 in which final purification of the argon is accomplished. High purity argon containing an average of less than about two ppmv oxygen and less than five ppmv nitrogen, and essentially free of other impurities, is discharged from the column as liquid bottoms stream 243; a portion of this stream is taken as product stream 245 and the remainder is vaporized in reboiler heat exchanger 249 against high pressure nitrogen stream 113 from the ASU. Vapor stream 250 is returned to the bottom of column 241 as boilup vapor and condensed nitrogen stream 251 is discharged from exchanger 249. Overhead stream 253 containing argon and nitrogen is discharged from column 241 and is partially condensed in reflux condenser heat exchanger 255 to yield stream 257, which is split into liquid stream 259 and vapor stream 261. Stream 259 provides reflux to column 241; stream 261 is warmed in heat exchanger 207 to recover refrigeration and is discharged as waste stream 263. Alternately, stream 261 could be returned to a suitable location in column 119 of FIG. 1 which would increase nitrogen and argon recovery. Nitrogen stream 251 is expanded through valve 265 and thereby cooled, and cooled stream 264 is warmed in exchanger 255 to yield nitrogen stream 271 which is returned to the air separation unit of FIG. 1. Additional refrigeration for condensing stream 253 is provided by expanding a stream 127 of liquid nitrogen from the air separation unit through valve 267 and combining it with expanded fluid from valve 265 to increase the flow of stream 264 to exchanger 255.

Alternate streams can optionally be used to provide condensing or vaporizing heat duty in boiler-condensers 249 and 255 of FIG. 2. For example, a portion 105 of the feed air stream 104 can be used in place of stream 113 to provide reboiler duty in boiler-condenser 249 and after expansion across valve 265 would provide at least a portion of the condenser duty in boiler-condenser 255. The resulting air stream 272 would be returned to the ASU low pressure column 119 of FIG. 1. As an alternate to the use of liquid nitrogen stream 127, a liquid air stream 179 can be withdrawn from the ASU main heat exchanger 103 and expanded across valve 267 to provide at least a portion of the refrigeration to boiler-condenser 255. The resulting stream 272 would be returned to the ASU low pressure column 119 as shown in FIG. 1. Optionally, nitrogen-containing stream 261 can be returned to the appropriate location in the low pressure portion of column 119 to increase argon and/or nitrogen recovery.

Figure 3:
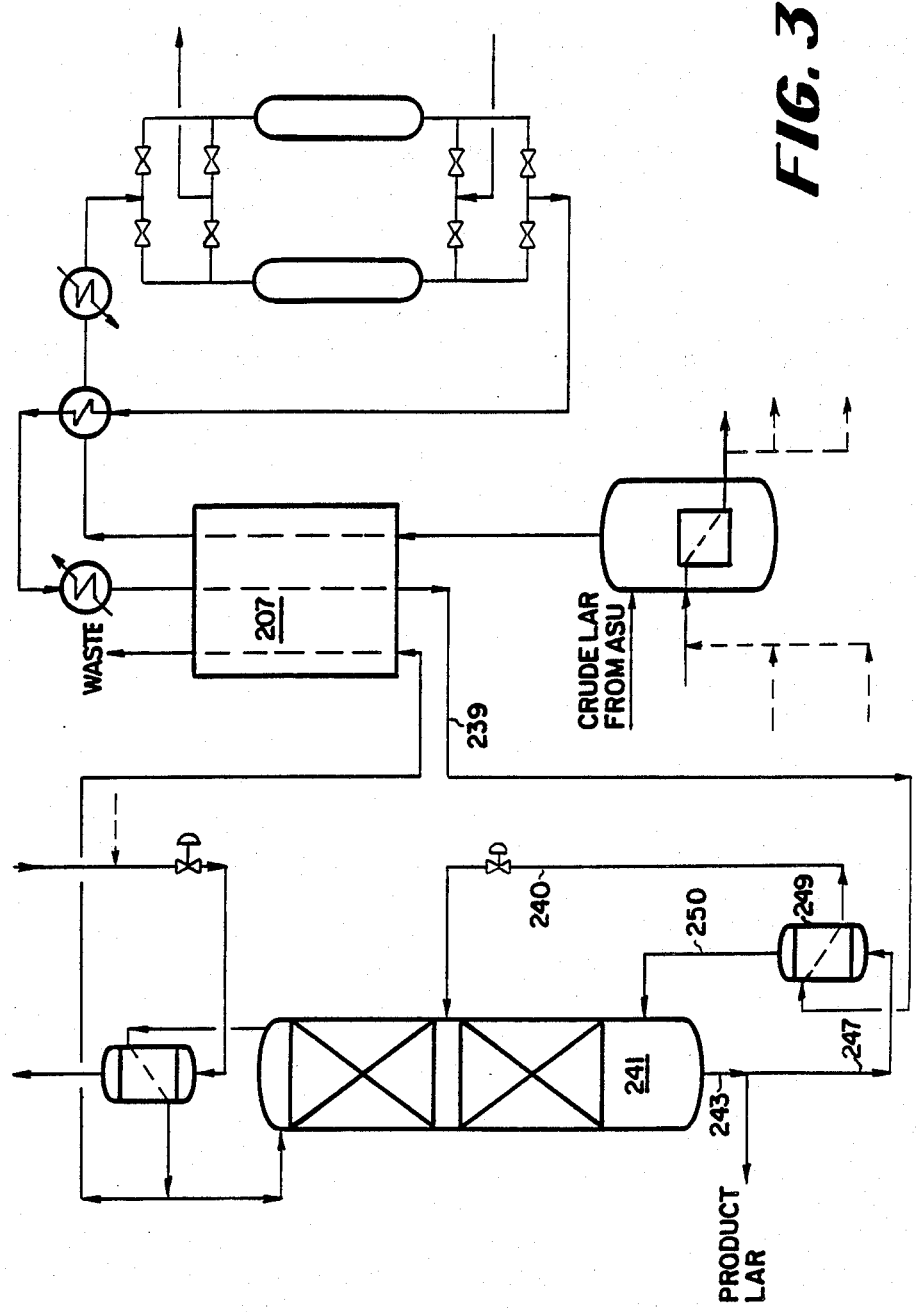
FIG. 3 is a schematic flow diagram of an alternate process of the present invention to purify crude argon.

An alternate mode of operation of the argon purification distillation system is shown in FIG. 3. Argon stream 239 after warming in exchanger 207 is used in reboiler condenser 249 to vaporize a portion 247 of liquid bottoms stream 243 from argon purification distillation column 241, thus providing argon vapor stream 250 which is returned as boilup vapor to column 241. Cooled argon stream 240 is then expanded and fed to column 241 for removal of impurities other than oxygen.

Figure 4:
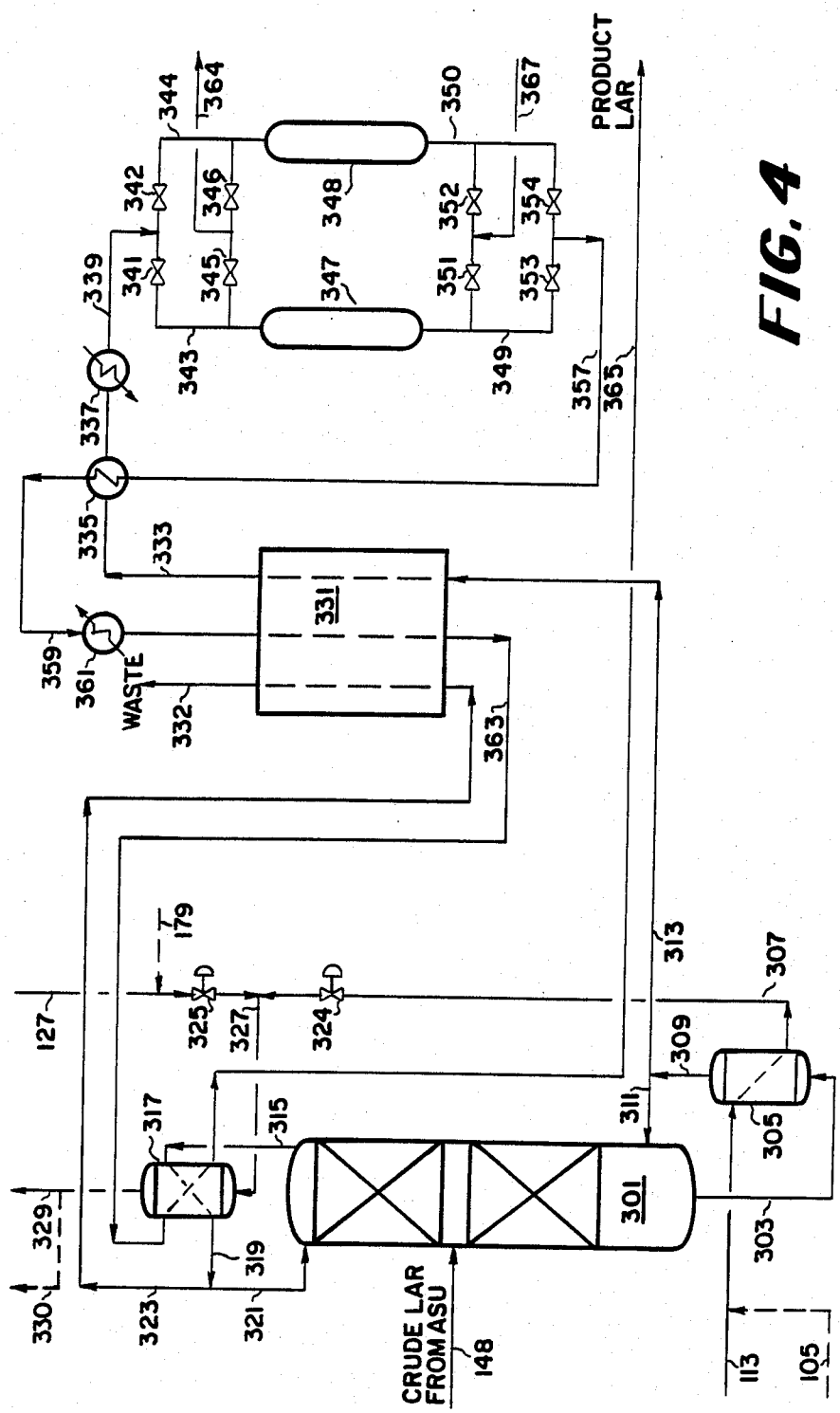
FIG. 4 is a schematic flow diagram of another alternate process of the present invention to purify crude argon.

A second embodiment of the invention is shown in FIG. 4, in which nitrogen and impurities other than oxygen are removed by distillation, and then oxygen is removed by reaction with a metal getter. Turning now to FIG. 4, crude liquid argon from the argon sidearm column of FIG. 1 is fed as stream 148 into argon purification distillation column 301 to yield bottoms stream 303 which contains less than five ppmv nitrogen and is essentially free of impurities other than oxygen and nitrogen, and overhead stream 315 containing argon, nitrogen, and other impurities. Purified crude argon bottoms stream 303 is vaporized against high pressure nitrogen stream 113 in heat exchanger 305 to yield vapor stream 309 and cooled nitrogen stream 307. A portion of stream 309 is passed as stream 311 to provide boilup vapor for column 301; the remaining portion as stream 313 is warmed in heat exchangers 331 and 335, and is further heated in heater 337 to yield stream 339 at between 200° and 450° F. Overhead stream 315 is at least partially condensed in heat exchanger 317 against stream 327, which comprises stream 307 after expansion across valve 324 and liquid nitrogen stream 127 after expansion across valve 325. Warmed nitrogen is returned to the air separation system as stream 329 as shown in FIG. 1. Alternately, a liquid air stream 179 can be withdrawn from the ASU main heat exchanger 103 and used in place of liquid nitrogen stream 127 for providing cooling to heat exchanger 317, and high air stream 105 can be used in place of high pressure nitrogen stream 113 in heat exchanger 305; in this case, warmed stream 330 would be returned to low pressure column 119 as shown in FIG. 1. Condensed stream 319 from heat exchanger 317 is split into stream 321 and 323; stream 321 provides reflux to column 301 and stream 323 is warmed to recover refrigeration in heat exchanger 331 and is discharged as waste stream 332. Alternately, stream 323 can be returned to the appropriate location in the low pressure portion of column 119 to increase argon and/or nitrogen recovery.

Heated argon stream 339, now at between about 20–45 psia and about 200°–450° F., containing up to about 0.8 mol % oxygen and up to five ppmv nitrogen, and essentially free of other impurities, passes through valve 341 and manifold 343 into reactor 347 which contains a bed of one or more reduced metal getters on a suitable catalyst support. The reduced metal getters can contain copper, nickel, or other metals which chemically adsorb oxygen and can be regenerated with hydrogen. In reactor 347, oxygen reacts with the metal getter to yield an oxidized metal getter and thus is removed effectively by chemisorption. A high purity argon product containing an average of less than about two ppmv oxygen passes through manifold 349 and valve 353, and the resulting stream 357 is cooled against crude argon stream 333 in exchanger 335. Stream 359 is cooled further in cooler 361 and heat exchanger 331, to yield gaseous high purity argon product stream 363.

During the purification of crude argon in reactor 347, valves 345, 351, 342, and 354 remain closed. Flow of argon through reactor 347 is continued for a predetermined period of time which depends upon the level of oxygen impurity in the crude argon; typically the period ranges between about 1 and 500 hours. Crude argon flow is then discontinued by closing valves 341 and 353, and flow is directed through valve 342, line 344, reactor 348, and valve 354. Valves 341, 346, 352, and 353 remain closed at this point. Reactor 348 contains the identical metal getter as initially contained in reactor 347, and the getter is in the reduced state after a previous regeneration step. While flow of crude argon into reactor 348 continues, the oxidized getter in reactor 347 is regenerated by opening valve 345 to depressurize the reactor through line 364, opening valve 351, and passing therethrough via line 367 a stream containing about 0.5 to 3.0 mol % hydrogen in nitrogen or other inert gas. The hydrogen reacts with the oxidized metal getter to form water which is purged from the system through line 364, yielding a reduced metal getter in reactor 347. Upon completion of this regeneration step, a stream of pure nitrogen or of the final purified argon product is passed through line 367, valve 351, reactor 347, valve 345, and line 364 to purge remaining water and hydrogen from the reactor. Valves 345 and 351 are then closed, valve 353 is opened to pressurize the reactor, and the reactor is ready for another period of argon purification. Optionally, the metal getter system can be designed and operated to produce a high purity argon product containing an average of less than about 1 ppmv oxygen by a combination of decreased reactor gas residence time and shorter onstream times between getter regeneration.

Argon product can be provided as a liquid by condensing stream 363 in heat exchanger 317 to yield high purity liquid argon product stream 365. Refrigeration for this condensation is provided by expanding cooled nitrogen stream 307 through valve 324, expanding a stream of liquid nitrogen 127 from the air separation unit through valve 325, combining the two resulting expanded streams into stream 327, and passing this stream through exchanger 317 to yield gaseous nitrogen stream 329 which is returned to the air separation unit. Liquid argon product is discharged as stream 365. Alternately, a liquid air stream 179 can be withdrawn from the ASU main heat exchanger 103 and used in place of liquid nitrogen stream 127 for providing cooling to heat exchanger 317.

EXAMPLE

Figure 5:
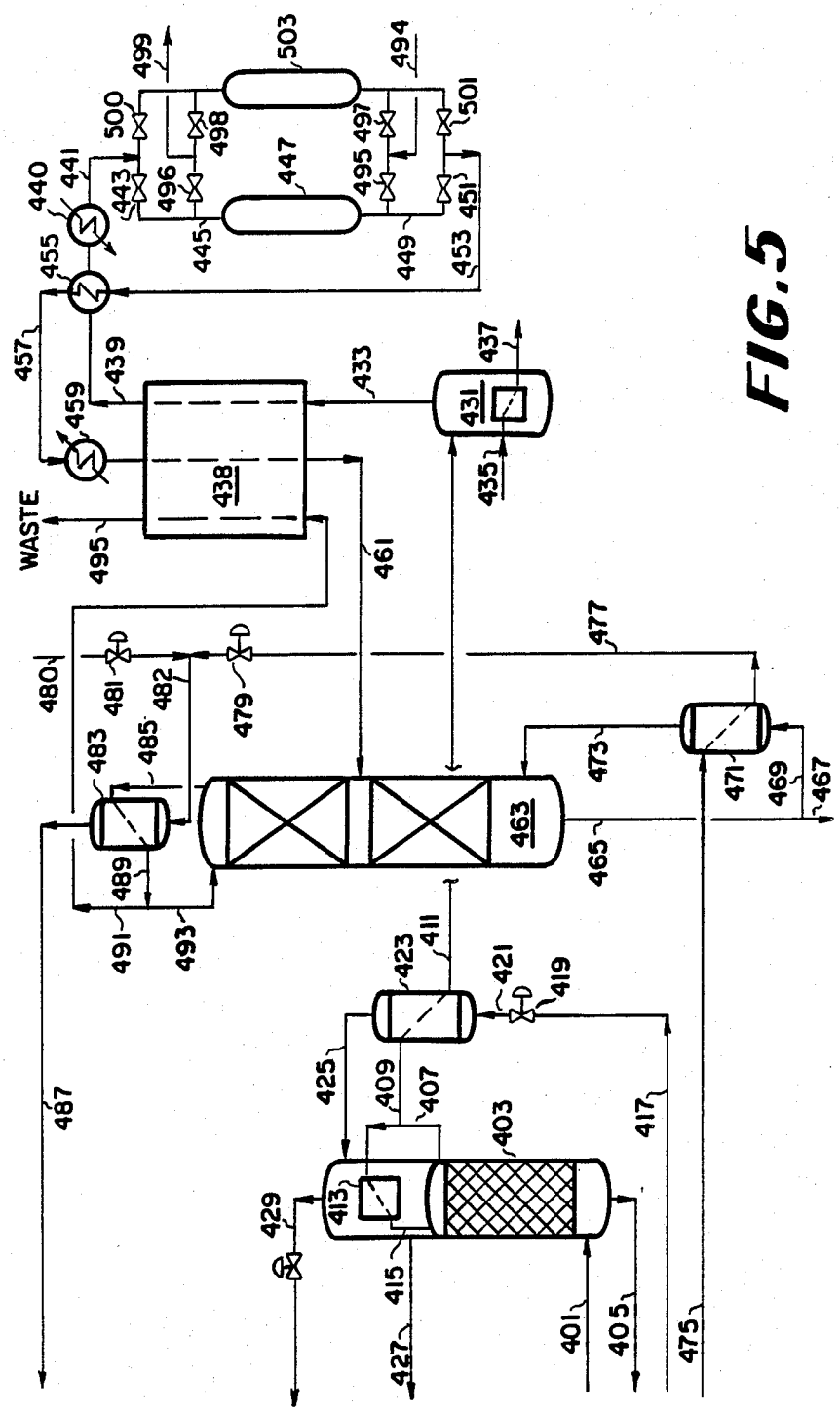
FIG. 5 is a schematic flow diagram for an example of the present invention.

A heat and material balance was prepared in an engineering design of the process described above for the first embodiment of the invention. The argon recovery and purification sections of the process are given in the schematic flow diagram of FIG. 5 and the properties of the key process streams are given in Table 1. Referring now to FIG. 5, sidestream 401 from a low pressure distillation column such as that earlier described is fed to the bottom of argon sidearm column 403. This feedstream contains about 15 mol % argon in oxygen and is at about 18 psia and −294° F. The stream is rectified in column 403 to yield an argon overhead vapor stream 407 which contains 700 ppmv nitrogen and less than 2000 ppmv oxygen. A portion of this stream is condensed against boiling crude liquid oxygen in reboiler-condenser 413 to provide reflux stream 415 for argon sidearm column 403. The remaining portion, stream 409, is condensed against boiling crude liquid oxygen in reboiler-condenser 423 to provide intermediate argon stream 411. Boiling crude liquid oxygen for reboiler-condensers 413 and 423 is provided by

HEAT AND MATERIAL BALANCE

EXAMPLE 1

(FIG. 5)

| HEAT AND MATERIAL BALANCE EXAMPLE 1 (FIG. 5) | | | | | | | | | |
|---|---|---|---|---|---|---|---|---|---|
| Stream → | 401 | 405 | 409 | 411 | 417 | 427 | 429 | 433 | 439 |
| Pressure, PSIA | 18.4 | 18.4 | 17.0 | 17.0 | 74.7 | 18.8 | 18.8 | 28.2 | 27.2 |
| Temp., °F. | −294.3 | −294.3 | −300.0 | −300.0 | −290.8 | −304.4 | −304.4 | −290.6 | 60 |
| Flow, mol/hr | 1727 | 1656 | 71 | 71 | 2221 | 151 | 2070 | 71 | 71 |
| Composition, mol % (ppmv) | | | | | | | | | |
| Nitrogen | (58.0) | (16.0) | (700) | (700) | 59.7 | 30.6 | 63.1 | (700) | (700) |
| Argon | 14.4 | 10.5 | 99.7 | 99.7 | 1.7 | 2.0 | 1.6 | 99.7 | 99.7 |
| Oxygen | 85.6 | 89.5 | 0.2 | 0.2 | 38.6 | 67.4 | 35.3 | 0.2 | 0.2 |
| Stream → | 441 | 453 | 457 | 461 | 467 | 475 | 480 | 487 | 491 |
| Pressure, PSIA | 25.2 | 22.2 | 21.2 | 19.2 | 20.2 | 72.9 | 72.8 | 31 | 18.8 |
| Temp., °F. | 300 | 356.7 | 109.9 | −288.6 | −297.0 | −290.4 | −310 | −307.9 | −305 |
| Flow, mol/hr | 71 | 69 | 69 | 69 | 68 | 79 | 99 | 178 | <1 |

-continued

HEAT AND MATERIAL BALANCE
EXAMPLE 1
(FIG. 5)

| Composition, mol % (ppmv) | | | | | | | | | |
|---|---|---|---|---|---|---|---|---|---|
| Nitrogen | (700) | (700) | (700) | (700) | (<5) | balance | balance | balance | 49 |
| Argon | 99.7 | 99.9 | 99.9 | 99.9 | balance | (200) | (200) | (200) | 51 |
| Oxygen | 0.2 | (<2) | (<2) | (<2) | (<2) | (2) | (2) | (2) | — | stream 417, which is a combined stream comprising subcooled crude liquid oxygen from the bottom of the high pressure column and liquified air stream 437 from reboiler-condenser 431. Stream 417 is expanded across valve 419 from 74.7 psia to about 18.8 psia to provide stream 421 for cooling in reboiler-condensers 413 and 423. Vaporized crude liquid oxygen and the remaining liquid are returned to the low pressure column as streams 429 and 427 respectively at a temperature of −304° F. Intermediate argon stream 411 is vaporized in reboiler-condenser 431 and is warmed to 60° F. in heat exchanger 438, and is further heated in heat exchanger 455 and heater 440 to yield stream 441 at 300° F. This stream passes through valve 443 and manifold 445 into reactor 447 at a flow rate of 71 lbmol/hr; the reactor is filled with 3000 lbs of BASF Catalyst R 3-11 intially in the reduced state. Oxygen reacts with the reduced copper to yield copper oxide and releases 74.2 kcal per mole of oxygen removed. Argon now containing less than 2 ppmv oxygen and 700 ppmv nitrogen exits reactor 447 at about 357° F. and flows through manifold 449, valve 451, line 453, heat exchanger 455, cooler 459, and heat exchanger 438. During argon flow through reactor 447, valves 495, 496, 500, and 501 remain closed. Stream 461, now at about −288° F., flows into argon purification distillation column 463, where nitrogen and other impurities are removed. Final high purity product liquid argon stream 467 contains an average concentration of less than 2 ppmv oxygen and less than 5 ppmv nitrogen. This argon represents a 91% recovery of the argon in the air feed to the high pressure column. A portion of the bottoms stream 465 is vaporized against gaseous nitrogen stream 475 at 72.9 psia from the high pressure column in reboiler-condenser 471 to yield boilup vapor stream 473 which is returned to column 463. Overhead vapor stream 485 containing 49 mol % argon and 51 mol % nitrogen at 18.8 psia is condensed in heat exchanger 483 and a portion of the resulting stream 489 is returned to the column as reflux stream 493. The remainder, stream 491, which is at −305° F., is warmed in exchanger 438 and vented as waste stream 495. Liquid nitrogen stream 477 and liquid nitrogen stream 480, both at about 73 psia, are expanded through valves 479 and 481 respectively, and the combined stream 482 is passed through heat exchanger 483 to condense the argon purification column overhead stream 485. Vaporized nitrogen stream 487 now at 31 psia and −308° F. is returned to the air separation unit and becomes part of the low pressure nitrogen product.

Flow of argon is continued through reactor 447 for 24 hours, and flow is then switched to reactor 503 by closing valves 443 and 451 and opening valves 500 and 501, while keeping valves 497 and 498 closed. Reactor 503 contains previously reduced copper getter catalyst which removes oxygen from the argon stream. Valve 496 is then opened to depressurize reactor 447, and Valve 495 is then opened and hot regeneration gas at 250° F. comprising about 1.0 mol % hydrogen in nitrogen flows through line 494 and is passed through reactor 447. The hydrogen reacts with the copper oxide in the catalyst to form water and elemental copper, and the water is purged from the system through valve 496 and vent line 499. When regeneration is complete, reactor 447 is purged with oxygen-lean argon product through valve 451 to remove water, hydrogen, and nitrogen from the reactor, which is then pressurized by closing valve 496 and is ready for another cycle.

The present invention utilizes improved crude argon recovery process with efficient final distillation and getter steps integrated into the crude argon recovery process to remove residual nitrogen and oxygen respectively from the crude argon, thus yielding a high purity argon product at high recovery in a simplified purification process. Prior art argon recovery systems typically produce a crude argon product containing between 2 and 5 mol % oxygen when argon recovery is in the range of 60 to 95% on air feed. Higher purity crude argon can be achieved only at reduced argon recovery. At these oxygen concentration levels, the commonly used method of oxygen removal is catalytic reaction with hydrogen over a platinum or palladium catalyst at temperatures approaching 900° F. to yield water. The argon is then cooled, dried, and further cooled to cryogenic temperature for removal of residual hydrogen and other impurities by distillation. A large recycle stream (about 1:1 recycle:crude argon) of ambient temperature deoxygenated argon is combined with the crude argon feed to the catalytic reactor to control the reactor exotherm at a safe level. This is required because the high heat of reaction with a feed containing 2-5 mol % oxygen can cause overheating of the reactor. A compressor or blower is required for this recycle. In addition, excess hydrogen is required to ensure satisfactory oxygen removal, and the removal of this excess hydrogen from the cooled and dried reactor effluent requires an additional high pressure distillation column for final argon purification. The additional hydrogen from this high pressure distillation column is typically warmed and recycled to the deoxygenation reactor.

In the process of the present invention, crude argon is produced with an oxygen content of less than 0.8 mol %. Because of this low oxygen concentration in the crude argon, it becomes possible to use the more cost effective getter process to remove residual oxygen. This in turn allows the elimination of the recycle system required in the prior art method, and the lower temperature required allows the use of carbon steel instead of stainless steel for the catalytic reactor. Most significantly, the present invention eliminates the cost and power requirements of the recycle compressor of the prior art method and simplifies the heat exchanger linking the cryogenic distillation columns and the high temperature deoxygenation reactor. In addition, the method of the present invention does not require mixing hydrogen with an oxygen-containing stream, which is inherently safer since a flammable mixture containing hydrogen and oxygen is avoided. Further, unlike the prior art method, there is no need for a drier after the reactor in the present invention, because water is formed only in the regeneration of the getter reactor and is discharged in the waste purge stream. Analyzers for measurement of excess hydrogen in the reactor effluent and oxygen in the reactor feed required in the prior art process are eliminated in the present invention. Finally, it is possible if desired to produce ultra-high purity argon containing less than one ppmv oxygen directly from the argon purification system. This is not possible with the prior art purification methods, in which additional purification equipment is required to meet this purity level.

It is also possible using the process of the present invention to achieve an argon recovery of greater than about 90% while simultaneously producing crude argon containing less than about 0.8 mol % oxygen for further purification to a final product containing less than 2 ppmv oxygen. This is accomplished by utilizing structured packing in at least a portion of the argon sidearm column, and operating the column as earlier described such that the number of theoretical stages in argon sidearm column 137 is at least that number required to produce the desired concentration of oxygen impurity in crude argon product stream 147. The flow rate of crude oxygen stream 136 is in the range of about 1.04 to about 1.36 times the theoretical minimum flow necessary to vaporize stream 136 completely in argon sidearm column reboiler-condenser 138 such that the resulting vapor is at its dew point and the flow rate of liquid stream 140 from the sidearm column 137 is zero.

We claim:

1. A process for the production of high purity argon comprising:
    (a) recovering an argon-enriched sidestream from a low pressure column of a cryogenic air separation distillation system comprising a high pressure column, said low pressure column, an argon sidearm column, and a main heat exchanger;
    (b) passing said argon-enriched sidestream into said argon sidearm column and withdrawing therefrom a crude argon stream containing less than about 0.8 mol % oxygen; and
    (c) passing said crude argon stream into a final purification system comprising a combination of a getter system for the removal of oxygen by chemical reaction with a metal-containing getter catalyst and an argon purification distillation column for the removal of impurities other than oxygen, and withdrawing from said final purification system a stream of said high purity argon.

2. The process of claim 1 wherein at least a portion of said argon sidearm column contains structured packing to promote mass transfer between the gas and liquid phases therein.

3. The process of claim 2 wherein a first portion of said crude argon stream is condensed by indirect heat exchange with a vaporizing stream of crude liquid oxygen from the bottom of said high pressure column and is returned as reflux to said argon sidearm column, and wherein the flow rate of said stream of crude liquid oxygen is in the range of about 1.04 to about 1.36 times the theoretical minimum flow of said stream of crude liquid oxygen necessary to vaporize said minimum flow completely to its dew point.

4. The process of claim 3 wherein a second portion of said crude argon stream is condensed by indirect heat exchange with said vaporizing stream of crude liquid oxygen to yield a crude argon product.

5. The process of claim 3 wherein the recovery of argon in said crude argon product relative to said air feedstream is at least about 90%.

6. The process of claim 1 wherein said metal getter catalyst comprises metal selected from the group consisting of copper, nickel, and combinations thereof.

7. The process of claim 1 wherein boilup vapor for said argon purification distillation column is provided by indirect heat exchange between a first fluid stream from said cryogenic air separation distillation system and a liquid bottoms stream from said argon purification distillation column, thereby producing a cooled first fluid stream and an argon-rich vapor stream, wherein at least a portion of said argon-rich vapor stream is returned as said boilup vapor to the bottom of said argon purification distillation column, and wherein said first fluid stream comprises high pressure nitrogen from said high pressure column or a portion of a cooled air feedstream to said high pressure column.

8. The process of claim 7 wherein at least a portion of the overhead reflux condenser refrigeration duty for said argon purification distillation column is provided by indirect heat exchange between an overhead vapor stream from said column and a further cooled first fluid stream which is obtained by expanding said cooled first fluid stream.

9. The process of claim 7 wherein at least a portion of the overhead reflux condenser refrigeration duty for said argon purification distillation column is provided by indirect heat exchange between an overhead vapor stream from said column and a second fluid stream which is obtained by expanding a stream of liquid nitrogen from said high pressure column or by expanding a stream of liquid air withdrawn from said main heat exchanger of said cryogenic air separation distillation system.

10. The process of claim 1 wherein said oxygen and said other impurity components are removed from said crude argon product by the sequential steps of:
    (a) heating said crude argon product and passing said crude argon product as a gas through a first bed of said metal-containing getter catalyst whereby oxygen is chemically sorbed by said catalyst and withdrawing therefrom an intermediate argon product; and
    (b) cooling said intermediate argon product, passing it into said argon purification distillation column, and withdrawing therefrom said high purity argon product and a byproduct stream comprising argon and impurities other than oxygen.

11. The process of claim 10 wherein said first bed of metal-containing getter catalyst is one of at least two parallel beds, each bed of which undergoes in turn the steps of:
    (a) passing said crude argon product through said bed wherein oxygen reacts with said metal-containing getter catalyst to form an oxidized metal getter and withdrawing therefrom said intermediate argon product;
    (b) isolating said bed and passing said crude argon product through another bed of said metal-containing getter catalyst;

(c) depressurizing said bed by withdrawing gas therefrom;
(d) passing through said bed a stream of inert gas containing between about 0.5 and 0.3 mole % hydrogen whereby the hydrogen reacts with said oxidized metal getter to form water and a reduced metal-containing getter catalyst;
(e) purging said bed with a stream of inert gas to sweep residual water and hydrogen therefrom; and
(f) pressurizing said bed with a stream of said intermediate argon product, and repeating step (a).

12. The process of claim 10 wherein said high-purity argon product is withdrawn as a liquid from said argon purification distillation column.

13. The process of claim 10 wherein said crude argon product is heated by indirect heat exchange with a stream selected from the group consisting of high pressure nitrogen from said high pressure column, high pressure air feed to said high pressure column, and crude liquid oxygen from said high pressure column.

14. The process of claim 10 wherein boilup vapor for said argon purification distillation column is provided by indirect heat exchange between a cooled stream of said intermediate argon product and a liquid bottoms stream from said argon purification distillation column, thereby producing a further cooled intermediate argon product and an argon-rich vapor stream, wherein at least a portion of said argon-rich vapor stream is returned as said boilup vapor to the bottom of said argon purification distillation column and said further cooled intermediate argon product provides feed to said argon purification distillation column.

15. The process of claim 1 wherein said oxygen and said other impurity components are removed by the sequential steps of:
(a) passing said crude argon product into said argon purification distillation column and withdrawing therefrom a purified crude argon stream containing oxygen as an impurity and a byproduct stream comprising argon and impurities other than oxygen; and
(b) heating at least a portion of said purified crude argon stream and passing the heated purified crude argon stream as a gas through a first bed of said metal-containing getter catalyst whereby oxygen is chemically sorbed by said catalyst and withdrawing therefrom said high purity argon product.

16. The process of claim 15 wherein said first bed of metal-containing getter catalyst is one of at least two parallel beds, each bed of which undergoes in turn the steps of:
(a) passing said heated purified crude argon stream through said bed wherein oxygen reacts with said metal-containing getter catalyst to form an oxidized metal getter and withdrawing therefrom said intermediate argon product;
(b) isolating said bed and passing said heated purified crude argon stream through another bed of said metal-containing getter catalyst;
(c) depressurizing said bed by withdrawing gas therefrom;
(d) passing through said bed a stream of inert gas containing between about 0.5 and 3.0 mole % hydrogen whereby the hydrogen reacts with said oxidized metal getter to form water and a reduced metal-containing getter catalyst;
(e) purging said bed with a stream of inert gas to sweep residual water and hydrogen therefrom; and
(f) pressurizing said bed with a stream of said high purity argon product, and repeating step (a).

17. The process of claim 15 wherein said high purity argon product is cooled and liquified, and wherein at least a portion of the refrigeration required to liquify said high purity argon product is provided by indirect heat exchange with a stream of expanded liquid nitrogen from said high pressure column or a stream of expanded liquid air withdrawn from said main heat exchanger of said cryogenic air separation distillation system.

* * * * *

UNITED STATES PATENT AND TRADEMARK OFFICE
CERTIFICATE OF CORRECTION

PATENT NO. : 4,983,194

DATED : January 8, 1991

INVENTOR(S) : J. A. Hopkins, et al

It is certified that error appears in the above-identified patent and that said Letters Patent is hereby corrected as shown below:

Claim 11, Column 15, Line 4
   Delete "0.3" and substitute therefor --3.0--

Signed and Sealed this

Thirtieth Day of June, 1992

*Attest:*

DOUGLAS B. COMER

*Attesting Officer*     *Acting Commissioner of Patents and Trademarks*